United States Patent [19]

Jourdain et al.

[11] Patent Number: 4,805,398

[45] Date of Patent: Feb. 21, 1989

[54] TURBO-MACHINE WITH DEVICE FOR AUTOMATICALLY CONTROLLING THE RATE OF FLOW OF TURBINE VENTILATION AIR

[75] Inventors: Gérard E. A. Jourdain, Corbeil Essonnes; Jean M. Payen, Le Mee sur Seine; Georges Mazeaud, Yerres, all of France

[73] Assignee: Societe Nationale d'Etude et de Construction de Moteurs d'Aviation "S. N. E. C. M. A.", Paris, France

[21] Appl. No.: 103,417

[22] Filed: Oct. 1, 1987

[30] Foreign Application Priority Data

Oct. 1, 1986 [FR] France ................................ 86 13671

[51] Int. Cl.⁴ .............................. F02C 3/00; F02C 5/00
[52] U.S. Cl. ..................................... 60/39.75; 416/95;
415/47; 415/116; 236/93 R
[58] Field of Search ............... 60/39.75, 39.83, 39.32;
416/95; 415/116, 47, 175; 236/93 R, 101 R

[56] References Cited

U.S. PATENT DOCUMENTS

| | | |
|---|---|---|
| 1,557,197 | 10/1925 | Dickey . |
| 2,811,833 | 11/1957 | Broffitt ................................ 415/116 |
| 3,029,064 | 4/1962 | Buckingham . |
| 3,078,671 | 2/1963 | Senser . |
| 3,814,313 | 6/1974 | Beam, Jr. et al. .................. 415/116 |
| 3,966,354 | 6/1976 | Patterson ............................. 415/116 |
| 3,975,901 | 8/1976 | Hallinger et al. ................... 415/115 |
| 4,109,864 | 12/1976 | Clayton . |
| 4,213,738 | 7/1980 | Williams ............................... 416/95 |
| 4,217,755 | 8/1980 | Williams ............................ 60/39.75 |

FOREIGN PATENT DOCUMENTS

| | | |
|---|---|---|
| 56172762 | 5/1983 | Japan . |
| 712346 | 7/1954 | United Kingdom . |
| 923789 | 4/1963 | United Kingdom . |

*Primary Examiner*—Donald E. Stout
*Attorney, Agent, or Firm*—Oblon, Fisher, Spivak, McClelland & Maier

[57] ABSTRACT

A device for automatically controlling the rate of flow of turbine ventilation air in a turbo-machine comprises two superimposed ceramic rings which are split and are each fixed at a single point to a metal support so that differential expansion of the support and the two rings in response to the operating conditions of the turbo-machine causes the registry of peripherally disposed slots in the ceramic rings to vary and thereby control the rate of ventilation air flow therethrough in accordance with the turbo-machine operating conditions.

10 Claims, 6 Drawing Sheets

TURBO-MACHINE WITH DEVICE FOR AUTOMATICALLY CONTROLLING THE RATE OF FLOW OF TURBINE VENTILATION AIR

BACKGROUND OF THE INVENTION (1) Field of the Invention

The invention relates to a turbo-machine device for automatically controlling the rate of flow of turbine ventilation air.

Research on improved performance in modern turbo-machines has resulted in an increase in operating temperatures, in turn requiring new materials satisfying these conditions of use. The control of thermal expansion and the need for improved operational behaviour and increased length of life of components has also led to a need for complex cooling systems which, in particular, use air bled from the cold parts of the machine to ventilate hotter parts, such as the turbine for example. Technical development has in fact been accompanied by a substantial increase in the temperatures at the turbine inlet.

One factor which also influences performance, and particularly efficiency or maximum thrust in aeronautical applications, is the control of minimal but adequate clearance between stationary and rotating parts of the turbo-machine. One of the means conventionally used to match the radial expansion or contraction of a stator element at a radial end of a rotating part (a rotor blade or element) to the radial movements of said end is to provide ventilation for the stator element.

It will therefore be apparent that control of the rates of flow of ventilation air is an important factor in controlling the operating conditions of a turbo-machine, irrespective of the use of such air, two examples of which are indicated above in connection with the cooling of the turbine elements or adjusting the operational clearances between the rotor and stator.

(2) Summary of the Prior Art

U.S. Pat. No. 3,975,901, for example, describes a device which meters a mixture of two gas flows at different temperatures, the mixture being applied to a turbine stator wall by means of a shutter which moves radially with respect to two gas passages, the movement being produced by thermal expansion. However, the use of such a device is a sensitive and complex matter and requires the use of two gas sources at different temperatures.

U.S. Pat. No. 3,029,064 describes means for controlling the supply of air to cooling chambers disposed around a turbine casing comprising butterfly valves, the movement of which is controlled by the differential expansion of a ring divided into cylindrical segments, each associated with a valve and having one end secured to the casing and the other connected to the valve. This device uses a plurality of valves, the lack of reliability of which may jeopardise its efficiency.

SUMMARY OF THE INVENTION

The object of the invention is to provide automatic control of the ventilation air flow rates in a turbine without the disadvantages of the known control devices. One important advantage of this automatic control is that it allows the rate of flow of turbine ventilation air to be permanently matched, during operation, to utilization requirements, for example flight needs in the case of aeronautical application to a turbo-jet engine of an aircraft. This results in an appreciable reduction of specific consumption in certain phases of flight, this being an essential parameter for such aircraft. The modulation can thus be applied to the part-load operating stages, which represent an appreciable proportion of the operating time, possibly in excess of 80%.

According to the invention a turbo-machine having a turbine ventilation air supply system is provided with a device for automatically controlling the rate of flow of the turbine ventilation air comprising two radially superimposed rings mounted concentrically on a support and disposed in the ventilation air supply system, each ring being open at a transverse slit and being fixed to said support at a single point diametrically opposite the transverse slit, the fixed points of the two rings being diametrically opposite one another, each ring having a plurality of slots which are uniformly distributed around its periphery, and the material from which the superimposed rings are made having a coefficient of thermal expansion which is distinctly different from that of the material from which the support is made, the arrangement being such that the slots in the two rings either register with each other to provide a maximum ventilation air flow, are completely offset from one another to shut off the ventilation air flow altogether, or are in an intermediate, partly registering, position to provide a modulated ventilation air flow, depending on the thermal expansion of the support caused by the operating conditions of the turbo-machine.

The way in which the passage area defined by the partial registration of the slots, which determines the rate of air flow, varies with temperature can advantageously be varied by appropriate selection of the shape of the slots.

Preferably, the support is made from a metallic material, and the superimposed rings are made of a ceramic material having a coefficient of thermal expansion distinctly less than that of the support material.

Advantageously, the superimposed rings of the control device can be disposed in the air cooling circuit of a turbine rotor stage or in a stator ring ventilation circuit in order to adjust the clearances between the rotor and the stator, or they may be disposed at the upstream end of a turbine ventilation circuit, adjacent the air bleed in the compressor housing.

The invention will be more readily understood, and other characteristics and advantages will be apparent, from the following description of various embodiments of the invention with reference to the accompanying drawings.

DESCRIPTION OF THE PREFERRED EMBODIMENTS

Figure 1:
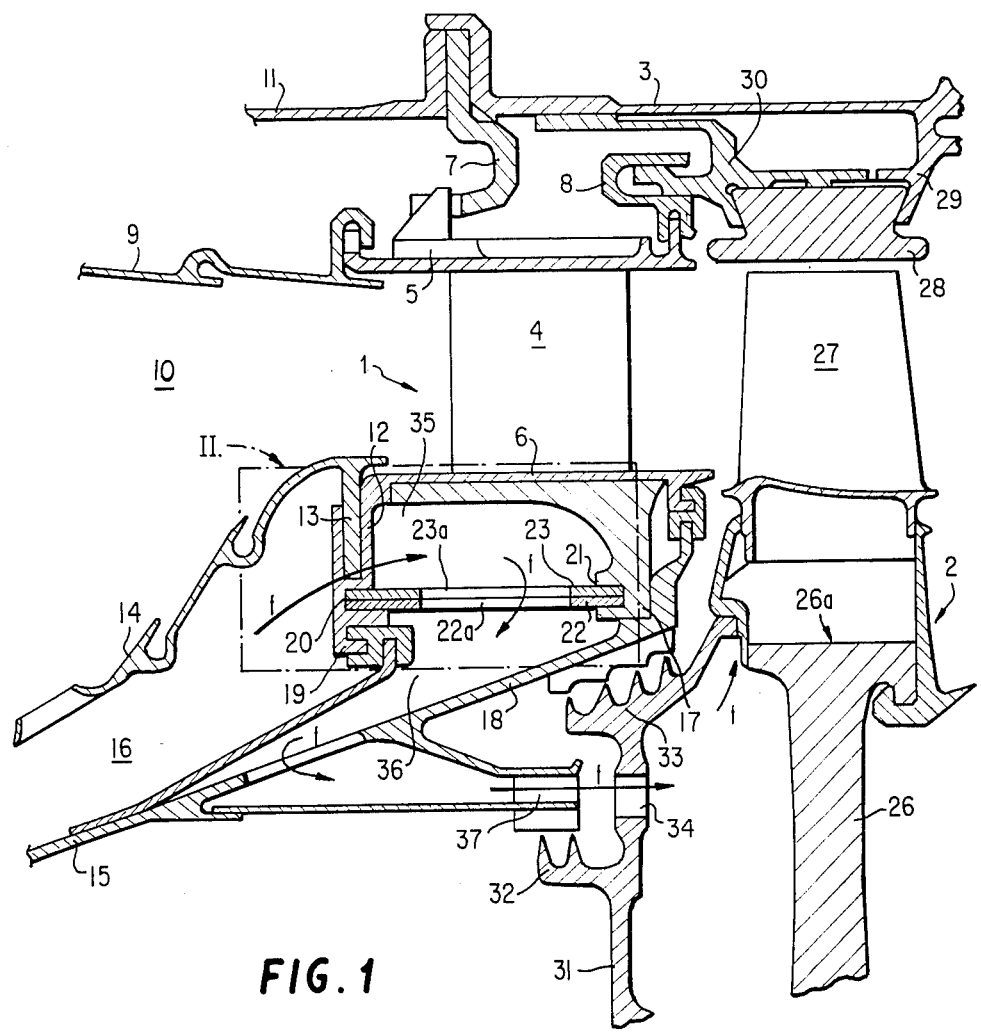
FIG. 1 is a partial half-view, in longitudinal section through the turbo-machine axis, of a turbine provided with a ventilation airflow control device in accordance with the invention applied to a cooling air supply circuit of a rotor stage.

Referring to FIG. 1, a turbine in accordance with the invention as partially illustrated comprises an inlet guide stator 1 and a rotor stage 2 which are mounted inside an outer turbine casing 3.

The stator 1 comprises guide vanes 4 mounted between a radially outer sleeve 5 and a radially inner sleeve 6. The outer sleeve 5 is secured to the casing 3 by means of upstream radial flanges 7 and downstream radial flanges 8, and is connected by further flanges to the outer jacket 9 of the combustion chamber 10 upstream thereof, the terms upstream and downstream being used with reference to the normal direction of movement of the main flow of the gases of the turbomachine. The turbine casing 3 is also connected by upstream flanges to the outer combustion chamber casing 11 On the inside the stator 1 has a peripheral vane root 12 on which on the upstream side is fixed on a flange 13 of the inner jacket 14 of the combustion chamber which together with an inner casing 15 of the chamber defines an inner combustion chamber enclosure 16. On the downstream side, the inlet guide vanes 4 similarly have a peripheral root 17. The inner casing 15 continues upstream in the form of an annular collar 18 which is connected to the downstream edge of the inner stator sleeve 6 and to the downstream peripheral root 17. A radial flange 19 is secured to the inner downstream combustion chamber flange 13 and is thus secured to the peripheral root 12.

Figure 4A:
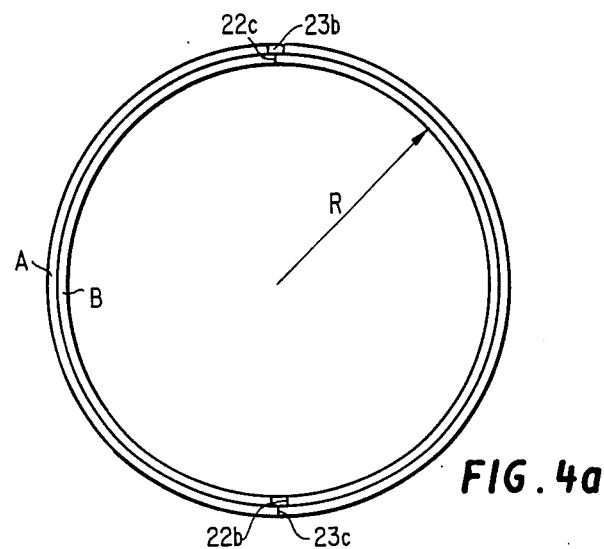
FIGS. 4a and 4b are diagrammatic cross-sections transverse to the turbine axis showing the mounting of the two superimposed rings on the support, at a cold temperature and at a hot temperature after thermal expansion of the support.
Figure 4B:
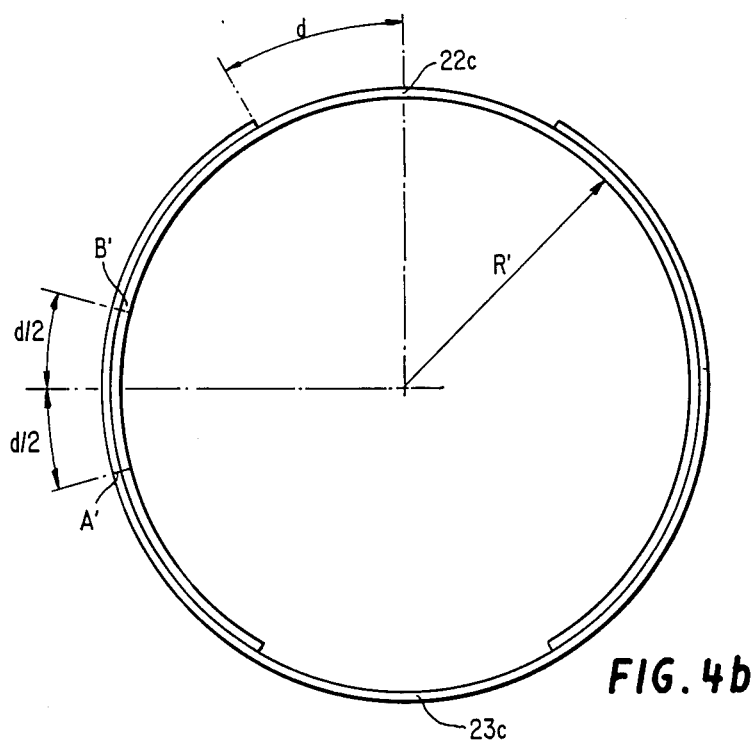
Figure 5A:
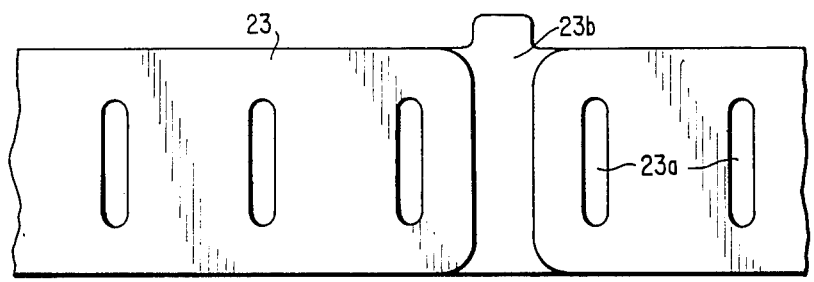
FIGS. 5a and 5b are partial developed top plan views of the superimposed rings used in the device shown in FIG. 1, at cold and hot temperatures.
Figure 5B:
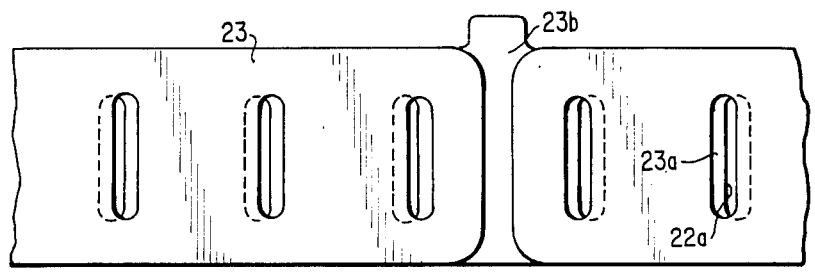

The downstream surface of flange 19 has a peripheral groove 20, and the peripheral root 17 also has a peripheral groove 21 on its upstream surface facing the groove 20. Two radially superimposed and concentric rings 22 and 23 are fitted in the grooves 20 and 21. The rings 22 and 23 are formed with slots 22a and 23a which are uniformly distributed peripherally. The materials from which are made, firstly, the rings 22 and 23 and, secondly, their supporting structures, in particular the supporting flange 19 and the supporting peripheral root 17, are different and have distinctly different coefficients of thermal expansion. Preferably the support structures are made of metal and the rings 22 and 23 are made of a ceramic material, which, for example, gives a difference of $12 \times 10^{-6}$ mm per degree C. between the coefficients of thermal expansion. Each ring 22 or 23 is open and has a transverse slit 22b or 23b, as will be seen in FIGS. 4a, 4b, 5a and 5b, and each ring is connected to the support at just one point which is thus a fixed point indicated at 22c and 23c in FIGS. 4a and 4b, the circumferential relative movements between the rings 22 and 23, on the one hand, and their supports, on the other hand, retaining complete freedom outside the respective fixed points. FIG. 4a diagrammatically shows two rings 22 and 23 mounted concentrically and in radial superimposition on a support. The respective fixed points of each ring 22c and 23c are diametrically opposite one another, and the slits 22b and 23b are respectively diametrically opposite the fixed points and also diametrically opposite one another. The rings are shown in a cold state in FIG. 4a, i.e. in the absence of any appreciable thermal expansion, and FIG. 4b illustrates the position of the rings when hot, the degree of displacement being exaggerated in order to facilitate understanding. FIG. 4b shows the position after thermal expansion of the support from a radius R to a radius R'. At the slits 22b and 23b each ring end has thus moved an amount $d = \pi(R'-R)$, and a point A on the ring 22 and a point B on the ring 23 situated half-way between the fixed points and the slits in the cold state shown in FIG. 4a have respectively moved as shown in FIG. 4b in opposite directions to one another to A' and B', each through a distance $d/2 = \pi/2(R'-R\,R)$. The variations obtained as a function of the temperature differences $\Delta T$ and the coefficient of thermal expansion $\Delta \alpha$ are:

$$R' - R = R \times \Delta \alpha \times \Delta T$$

Figure 2:
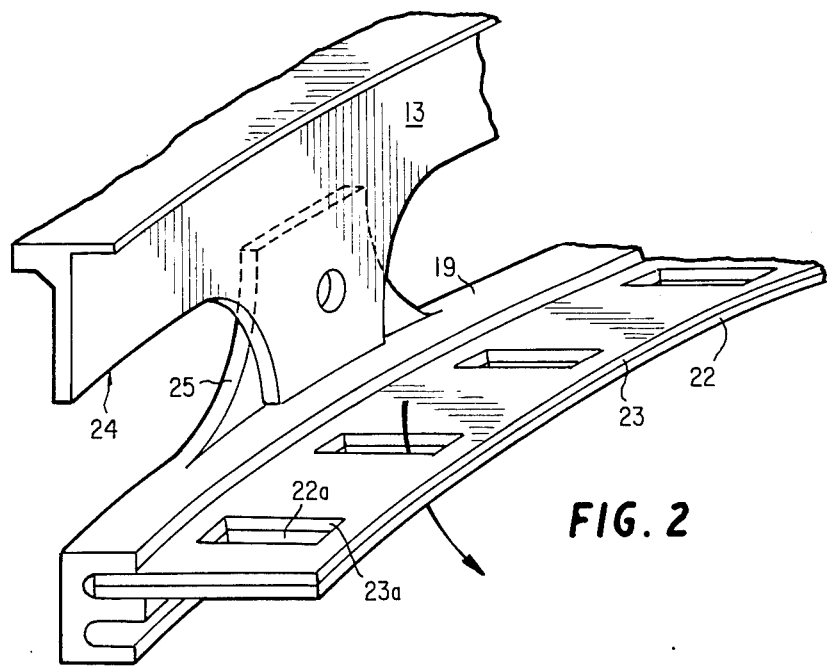
FIG. 2 is a partial perspective view to an enlarged scale of detail II in FIG. 1 showing the mounting of two superimposed rings on a support in the air flow control device.
Figure 3:
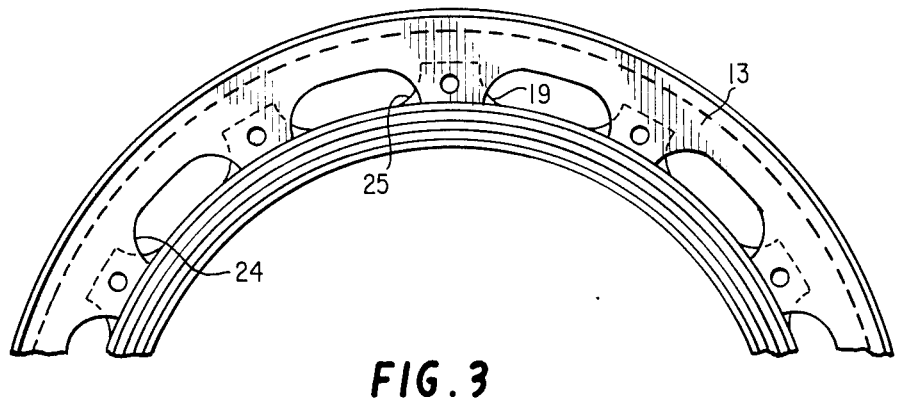
FIG. 3 is a partial transverse view of the support shown in FIG. 2.

As will be seen from FIGS. 2 and 3, the flange 13 has cut-outs 24 which are distributed uniformly around the flange, and similarly the radial flange 19 has co-operating cut-outs 25 which are also uniformly distributed peripherally.

Furthermore, downstream, the rotor stage 2 of the turbine comprises a disc 26 on which the movable blades 27 are mounted in sockets 26a. At the tips of the blades 27 the stator conventionally has a sealing ring 28 secured to the turbine casing 3 by a radial flange 29 and a support ring 30. Upstream, a disc 31 is also associated with the rotor disc 26, the disc 31 bearing labyrinth seals 32 and 33 and being formed with bores 34 which are distributed uniformly in a ring.

The above-described turbine comprises a ventilation path for air-cooling the rotor stage 2 and particularly the sockets 26a of the disc 26 and the blade roots 27 mounted therein. The air flows along this ventilation path are controlled by the device in accordance with the invention, which operates as follows. The cooling air is bled from the combustion chamber enclosure 16 and passes through the cut-outs 24 and 25 in the flanges 13 and 19 to enter an annular enclosure 35 formed between the superimposed rings 22 and 23 and the inner stator sleeve 6, and then through the slots 22a and 23a in the rings 22 and 23 into an enclosure 36 formed between said rings 22 and 23 and the annular collar 18. From there the air is fed through accelerators 37 borne by said collar 18 and through the bores 34 in the labyrinth disc 31 towards the sockets 26a of the turbine rotor disc 26. The cooling air path is represented by arrows f in FIG. 1. The slots 22a and 23a in the superimposed rings 22 and 23 are so disposed that in the cold state there is no air passage possible through the slots 22a and 23a, which are completely offset from one another.

On the other hand, when the temperature rises, the thermal expansion of the supports formed by the flange 19 and the peripheral root 17 and the associated structures cause the slots 22a and 23a to communicate with one another, thus allowing passage of air and hence cooling at the sockets 26a of the rotor disc 26. For a given high operating temperature, for example equivalent to transient acceleration operating conditions for which maximum cooling must be applied, the registry of the slots 22a, on the one hand, and 23a on the other, may be complete, thus giving maximum air flow.

Figure 6C:
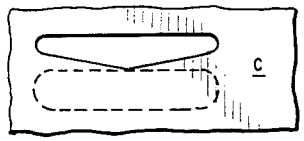
FIGS. 6a, 6b and 6c are diagrams illustrating different forms of slots which may be used in the superimposed rings in the device shown in FIG. 1.
Figure 6B:
Figure 6A:
Figure 7:
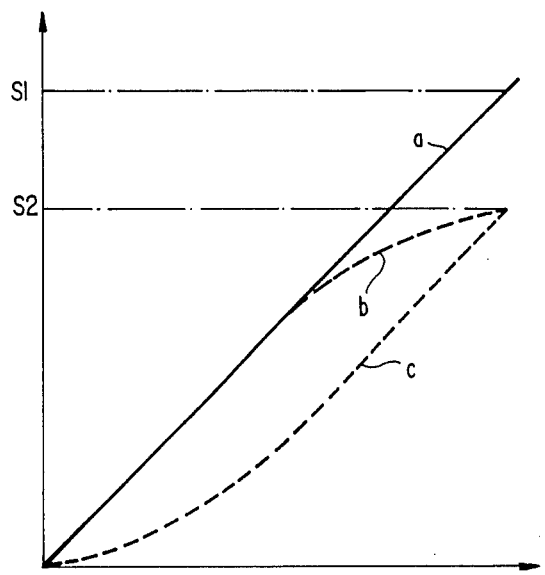
FIG. 7 illustrates graphically the variation of the passage section in the slots shown in FIGS. 6a, 6b, 6c as a function of temperature.

Depending upon the temperature variations, control of the rate of air flow resulting directly from the variation in the passage area through the slots 22a and 23a may be adjusted according to the operating characteristics of the machine. Thus, as shown in FIGS. 6a, 6b, 6c, the slots may have different shapes, e.g. rectangular, trapezoidal or triangular. Depending upon the shape selected, as shown in the graph in FIG. 7, the resulting relationship between the variation of the passage area and the temperature is either linear (curve a corresponding to rectangular slots as in FIG. 6a) or non-linear (curves b and c corresponding respectively to the slots in FIGS. 6b and 6c).

An automatic device for controlling the air flow rate as described above in a cooling air supply circuit for a turbine element may be used wherever air flow control is required in a turbo-machine zone in which thermal expansion occurs as a result of variations in temperature due to the operating conditions of the turbo-machine. Ventilation control is thus applied as a function of the heating of the bled air.

A second application of the air flow control device in accordance with the invention will now be described, by way of example, with reference to FIG. 8 which shows a part of a turbine comprising an outer casing consisting of a number of elements 111, 103 and 103a longitudinally connected by flanges. An annular support 130 is fixed to the casing and carries a sealing ring 128 by means of upstream annular radial flanges 138 and downstream annular radial flanges 139, the sealing ring 128 being disposed adjacent the tips of the rotor blades 127. An annular collar 140 made of thin sheet-metal and having uniformly distributed multi-perforations 140a is mounted on the radially outer side of the annular support 130 on which it bears, for example, by means of a system of balls 141. The annular support 130 and the collar 140 have a U-shaped section which thus defines an annular enclosure 142, and this is divided into two by radially superimposed and concentric rings 122 and 123 which are similar to the rings 22 and 23 described in the previous embodiment with reference to FIGS. 1 to 7. The superimposed rings 122 and 123 are of ceramic material and also have slots 122a and 123a. The enclosure 142 is closed by a radially outer member 143 which has peripherally distributed passages 143a corresponding to passages 103b also formed in the outer casing 103. These passages 143a and 103b are connected by spools 144 and connected to a system for bleeding air from the turbo-machine compressor, which is not shown in the drawing.

The operation of the device for controlling the air flow is similar to that described hereinbefore with reference to FIGS. 1 to 7. During cruising or when cold, the slots 122a and 123a of the superimposed rings 122 and 123 are disposed so as to be completely offset and the air intake is thus stopped. No ventilation of the turbine stator ring is used and no air is bled from the compressor. On the other hand, under transient acceleration conditions of the machine, at full throttle, the hot air bled from the compressor is fed via the passages 103b, 143a to the enclosure 142; this results in thermal expansion of the metal support 140 of the superimposed rings 122 and 123 and, as described previously, a contra-directional circumferential movement of the two rings 122 and 123 progressively brings the slots 122a and 123a into register. The impact of the resulting air jets through the multiperforations 140a thus causes thermal expansion of the annular support 130 and results in a radial movement of the sealing ring 128 which, in these conditions of operation, allows sufficient clearance between the turbine rotor and stator. The arrows f in FIG. 8 represent the ventilation air path.

Figure 9:
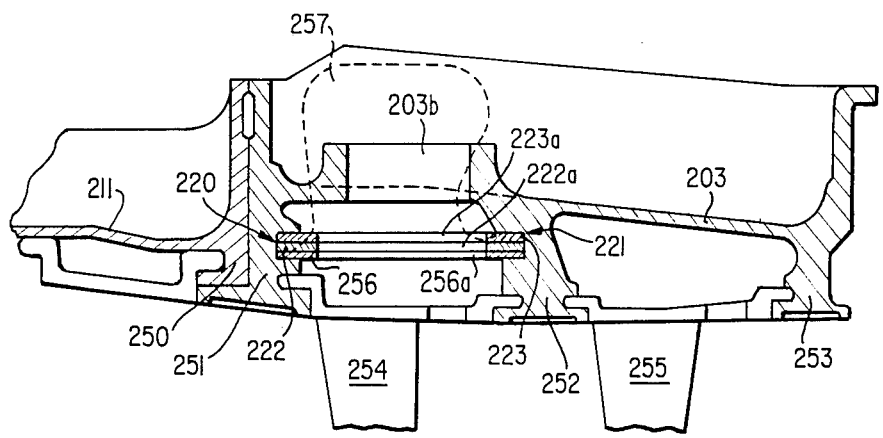
FIG. 9 is a partial half-view in longitudinal section of a turbo-machine compressor at the air bleed intended for ventilation/cooling of the turbine and comprising a flow control device in accordance with the invention; and, FIG. 10 is a partial view in transverse section of the device shown in FIG. 9.
Figure 10:
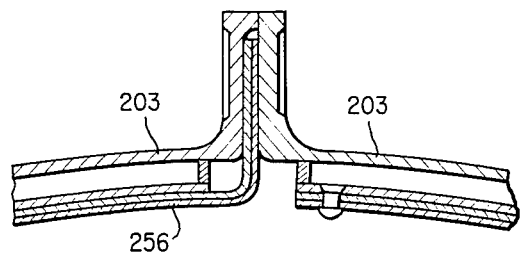

Another embodiment of the invention is illustrated in FIGS. 9 and 10. In this example, the flow of ventilation and cooling air in a low-pressure turbine of a turbo-machine (stator stage and rotor stage) is matched to user requirements, in the case of a turbo-jet engine, as required by flight conditions, while allowing a reduction of the specific consumption in certain phases of flight, by placing a flow control device in accordance with the invention in the air supply circuit. In the example illustrated in FIGS. 9 and 10, the device in accordance with the invention is disposed inside the housing of the high-pressure compressor of the turbo-machine at the compressor stage where the air is bled. In FIG. 9, the compressor housing comprises a number of elements 211, 203 longitudinally connected by external flanges. These housing elements 211, 203 also have inner radial flanges 250, 251, 252, 253 which support fixed stator vane stages such as 254, 255. The flanges 251 and 252 of the compressor housing 203 also have facing peripheral grooves 220 and 221 respectively. Two radially superimposed and concentric rings 222 and 223 made of a composite material of the ceramic type are mounted in these grooves 220 and 221, and radially inwards thereof a third ring 256, which is made of metal, is also mounted in the circular grooves 220 and 221. The three rings 222, 223 and 256 are each formed with slots 222a 223a, 256a, which are uniformly distributed peripherally, and each ceramic ring 222 and 223 is connected to the metal ring 256 at just one point. The rings 222, 223 and 256 are open, and the two respective fixing points are situated at the ends of the metal ring 256. Adjacent the slots 222a, 223a and 256a the compressor housing 203 has passages 203b which externally lead into a manifold 257 from which air is fed to the turbine. When the compressor housing consists of two semi-cylindrical parts the rings 222, 223 and 256 of the airflow control device also respectively comprise two segments, the connection of which is shown in FIG. 10.

Figure 8:
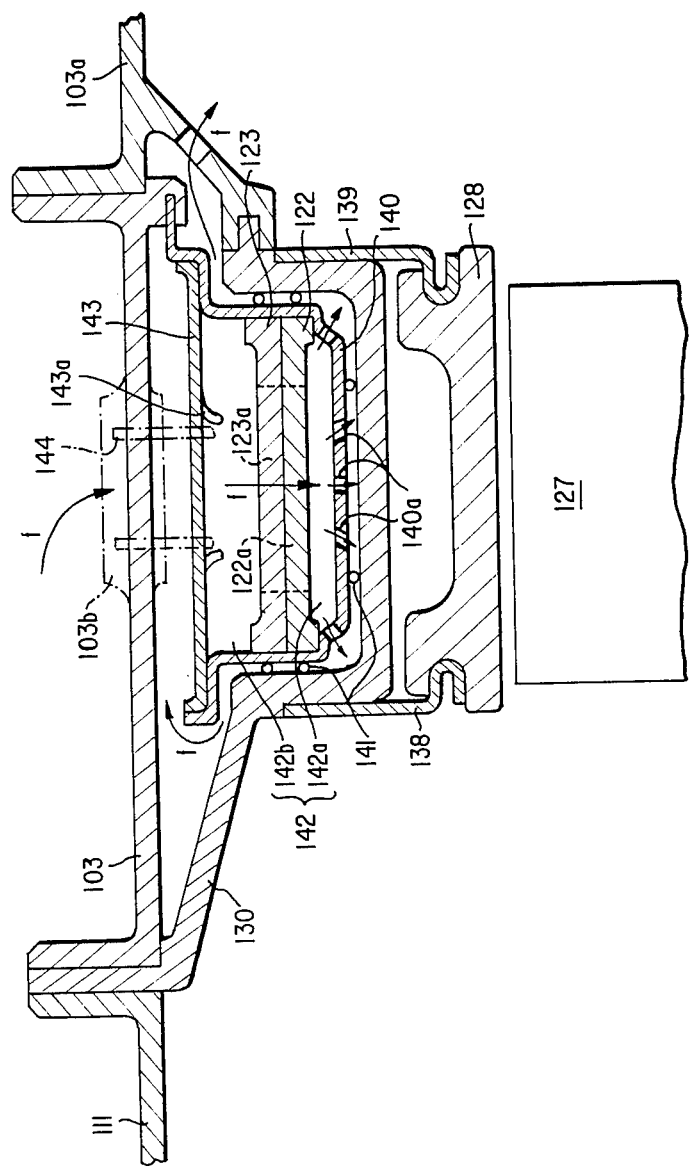
FIG. 8 is a partial half-view, in longitudinal section through the turbo-machine axis, of a turbine provided with a ventilation airflow control device in accordance with the invention and similar to the device shown in FIG. 1, applied to control radial movements of a stator ring for adjustment of the clearances between the rotor and stator.

The operation of the air flow control device is similar to that described hereinbefore with reference to FIGS. 1 to 7 or with reference to FIG. 8. The metal ring 256 is directly exposed to the heat source constituted by the air being bled from the compressor stream, and the linear movement is thus controlled by the metal ring 256. Consequently, closure or opening of the air passage slots as a result of the superposition of the slots 222a, 223a and 256a is controlled by the relative expansion of the rings which are made of materials having very different coefficients of thermal expansion, i.e. ceramics for the rings 222 and 223, and metal for the ring 256. These variations in expansion are due to the thermal changes of the bled air depending upon the conditions of operation of the turbo-machine, which also correspond to the turbine ventilation requirements.

The device in accordance with the invention, the operation of which has been described hereinbefore with reference to three different applications for controlling ventilation air flows in a turbine, has numerous advantages:

it allows a wide variation of the flow rate;
it ensures homogeneous distribution over the entire periphery in every case;
control of the flow rate is obtained without the need for any appreciable radial bulk, which is particularly advantageous for aeronautical applications;
it has high operational safety and excellent reliability; and,
it covers wide areas of application for the control of air flow wherever operation results in temperature variations, and adjustment of the device is facilitated since it is possible to govern the variation of the passage area in dependence on temperature by selecting different shapes for the co-operating slots 122a and 123a in the two superimposed rings 122 and 123.

We claim:

1. In a turbo-machine,
a turbine,
a system for supplying ventilation air to said turbine, and
a device for automatically controlling the rate of flow of said turbine ventilation air in said system, said control device comprising
a support,
two radially superimposed rings mounted concentrically on said support, each of said rings having
a transverse slit whereat said ring is open, and
a plurality of slots uniformly distributed around the periphery of said ring,
means fixing each of said superimposed rings to said support at a single point diametrically opposite said transverse slit of said ring, the fixed points of said two rings being diametrically opposite one another,
said two superimposed rings and said support being disposed in said ventilation air supply system, and
said two superimposed rings being made of a material having a coefficient of thermal expansion which is distinctly different from that of the material from which said support is made,
whereby said peripheral slots in said two superimposed rings either register with each other to provide a maximum ventilation air flow, are completely offset from one another to shut off the ventilation air flow altogether, or are in an intermediate, partly registering, position to provide a modulated ventilation air flow, depending on the thermal expansion of said support caused by the operating conditions on said turbo-machine.

2. A turbo-machine as claimed in claim 1, wherein said support is made from a metallic material, and said two superimposed rings are made of a ceramic material having a coefficient of thermal expansion distinctly less than that of said support material.

3. A turbo-machine as claimed in claim 1, wherein said peripheral slots of said superimposed rings have a rectangular shape whereby the passage area defined by partial registration of said slots varies linearly with temperature.

4. A turbo-machine as claimed in claim 1, wherein said peripheral slots of said superimposed rings are of a shape whereby the passage area defined by partial registration of said slots varies non-linearly as a function of temperature.

5. A turbo-machine as claimed in claim 4, wherein said peripheral slots in at least one of said superimposed rings are of trapezoidal shape.

6. A turbo-machine as claimed in claim 4, wherein said peripheral slots in at least one of said superimposed rings are of triangular shape.

7. A turbo-machine as claimed in claim 1, wherein said turbine comprises
a rotor stage,
an array of fixed inlet guide vanes upstream of said rotor stage and having an inner peripheral root,
a combustion chamber upstream of said inlet guide vanes, and
an enclosure to said combustion chamber, and wherein said support of said control device comprises
a radial wall of said inner peripheral root,
a radial flange fixed to said inner peripheral root and axially spaced from said radial wall, and
means defining annular grooves in said radial wall and said radial flange within which said superimposed rings are mounted,
whereby said control device controls the flow of cooling air from said combustion chamber enclosure to said rotor stage of said turbine.

8. A turbo-machine as claimed in claim 1, wherein said machine includes a compressor, and said turbine comprises a rotor and a stator, said stator including a sealing ring surrounding said rotor, and an annular U-section support carrying said sealing ring and defining an annular enclosure, and wherein said support and said superimposed rings of said control device are disposed within said annular enclosure so as to control the flow of ventilation air bled from said compressor to said support of said stator sealing ring whereby adjustment of the operational clearances between said rotor and said stator is achieved by controlling the radial movements of said sealing ring according to the thermal expansion of said support thereof.

9. A turbo-machine as claimed in claim 1, wherein said machine includes a compressor having a housing, and said control device is disposed in said housing to control the flow of ventilation air bled from said compressor to feed said turbine ventilation air supply system, said housing having two inner radial flanges and two facing annular grooves in said flanges, said superimposed rings of said control device being made of a ceramic material and mounted in said annular grooves, and said support of said control device comprising an additional open ring superimposed on the radially inner side of said ceramic rings, said additional ring being made of metal and also having periphally disposed air passage slots, and each of said ceramic rings being connected to said metal ring at a single point respectively at each end of said metal ring.

10. A turbo-machine as claimed in claim 9, wherein said two superimposed ceramic rings and said metal support ring are each formed of two segments, the fixing points being distributed respectively at the opposite ends of said segments.

* * * * *

UNITED STATES PATENT AND TRADEMARK OFFICE
CERTIFICATE OF CORRECTION

PATENT NO. : 4,805,398

DATED : FEBRUARY 21, 1989

INVENTOR(S) : GERARD E. A. JOURDAIN ET AL

It is certified that error appears in the above-identified patent and that said Letters Patent is hereby corrected as shown below:

In column 1, line 13, change "behaviour" to --behavior--;

line 55, change "jeopardise" to --jeopardize--;

In column 4, line 29, change "(R'-RR) to --(R'-R);

In column 6, line 12, change "multiperforations" to --multi-perforations--

In column 8, line 59, change "periphally" to --peripherally--.

Signed and Sealed this

Fifteenth Day of May, 1990

Attest:

HARRY F. MANBECK, JR.

*Attesting Officer*　　　　　*Commissioner of Patents and Trademarks*